United States Patent [19]

Arena-Ochoa

[11] 4,434,457
[45] * Feb. 28, 1984

[54] NONSATURATING ELECTRONIC BALLAST FOR GAS DISCHARGE TUBES

[76] Inventor: Guido Arena-Ochoa, Colina de la Ilusion #49, Fraccionamiento Bulevares, Edo.d, Mexico

[ * ] Notice: The portion of the term of this patent subsequent to Jun. 30, 1998 has been disclaimed.

[21] Appl. No.: 315,421

[22] Filed: Oct. 27, 1981

[30] Foreign Application Priority Data

Oct. 27, 1980 [MX] Mexico ................................. 184492

[51] Int. Cl.³ .......................................... H02M 7/537
[52] U.S. Cl. ............................... 363/133; 315/DIG. 7; 331/114
[58] Field of Search .................... 363/37, 97, 131, 133; 331/114; 315/219, DIG. 7

[56] References Cited

U.S. PATENT DOCUMENTS 2,849,615  8/1958  Gustafson ........................... 363/133
4,276,496  6/1981  Arena-Ochoa ....................... 315/206

FOREIGN PATENT DOCUMENTS 2437458  2/1976  Fed. Rep. of Germany ...... 363/131

Primary Examiner—William H. Beha, Jr.
Attorney, Agent, or Firm—Roylance, Abrams, Berdo & Goodman

[57] ABSTRACT

A solid-state power generator or inverter for operating a load such as one or more gas discharge lamps from a DC or rectified AC power source includes two principal circuits, one being a drive circuit with pulse formation derived by negative feedback and the other being an inductively driven or dependent circuit with pulse formation by positive and negative feedback. The circuits operate in 180° phase relationship. The circuits as disclosed are identical except for a capacitor in the first which is not present in the second. The circuits are coupled by a five-winding nonsaturable core transformer in which DC pulses passing through two primary windings induce in one secondary winding a sinusoidal EMF proportional to the product of the two primary currents and, in turn, proportional current flows in the load. Open circuit protection is also provided.

6 Claims, 5 Drawing Figures

NONSATURATING ELECTRONIC BALLAST FOR GAS DISCHARGE TUBES

This invention relates to an inverter circuit for supplying electrical power to a load and particularly to a power pulse generator which includes two feedback circuits, one being the driver or motor and the other the driven circuit. The two are magnetically coupled by a five-winding nonsaturable core transformer obtaining, through the feedback circuit configuration, alternating sinusoidal power to drive a load such as gas discharge lamp connected to the inverter output.

BACKGROUND OF THE INVENTION

For some time the use of solid-state ballasts or electronic generators has rapidly expanded as a result of various advantages such as energy savings, instantaneous starting, suppression of the stroboscopic effect which can cause eye damage, reduction or elimination of ballast hum, direct current applications, etc. All these advantages and more are inherent in electronic generator ballasts as opposed to the conventional electrical alternating current ballasts.

However, the majority of present pulse generators, as a result of their circuit configuration, produce voltage peaks which are detrimental to lamp filaments. They also fail to develop sufficient output to operate gas discharge lamps above 40 W, since many of these pulse circuits incorporate only a single transistor in their output circuits.

BRIEF DESCRIPTION OF THE INVENTION

The object of this invention is to overcome the abovementioned disadvantages while at the same time incorporating certain advantages cited in Arena-Ochoa U.S. Pat. No. 4,276,496 such as open-circuit protection provided by frequency change and also a nonsaturating generator. Therefore, this generator is designed to obtain a sinusoidal wave induced in the secondary winding or load winding of an output transformer which results from the sum of the 180° out-of-phase alternating direct current pulses flowing through two primary windings of the five winding output transformer thereby securing with a very simple and efficient system the necessary volume of output power needed to drive high wattage lamp loads in conjunction with a very nearly pure sinusoidal output wave since this in an inductive transfer system.

A further advantage of the present pulse generator is that no starter circuit is necessary since conductivity of the drive or motor feedback circuit is obtained by means of a polarization resistance, generating pulses as a consequence of negative feedback in the drive circuit while at the same time inducing in the feedback loop of the driven circuit alternating pulses.

A brief summary in accordance with the goal of this invention is a solid state feedback generator which among other possible uses is well suited as a ballast for the starting and operating of gas discharge lamps with considerable efficiency advantages in respect to prior generators principally in high wattage lamps or where nearly pure sinusoidal current and power are required.

From the configuration of its components this pulse inverter system may be considered as two feedback circuits magnetically coupled by a transformer with five windings and in which one circuit is the driver circuit with the ultimate goal, as stated, of a simple system of efficiently producing in the secondary winding a high power output in sinusoidal form that can, in one of its many applications, be utilized for driving one or more large gas discharge lamps.

More explicitly, the first feedback circuit is the motor or driver circuit for the second feedback circuit, or driven circuit, and includes a signal transistor and one or more power transistors connected as a two stage emitter-follower, a small capacitance capacitor, a limiting resistor and one of the two second secondary windings of the transformer which closes this circuit.

The second or inductively driven circuit of the generator basically consists of a second group of transistors and circuit components connected in a similar configuration as the first group but without the small capacitance capacitor which would have no function in this inductively driven circuit.

Too, the second winding of the two second secondary windings has an electrical phase angle of 180° in respect to the first winding of said windings. In addition, the driver and driven circuits are so connected magnetically that the driven feedback circuit receives pulses induced from the driver circuit. Furthermore, the operating frequency is determined by the equivalent capacitance of the system.

Also, due to the configuration of output capacitors, in the event of an open circuit or at lamp burnout or removal, circuit capacitance is radically reduced; thus a considerable increase in frequency results which, in turn, severely limits conduction in both driver and driven circuits, principally as a result of two slow recovery diodes connected to the bases of both signal transistors with additional current braking realized from the high inductance choke coils placed in the collector circuit of these same signal transistors. Thus, open circuit protection is provided for the system. Also, the choke coils limit amplification in the transistors of transient disturbances originating in the gas-discharge lamp load due to false contacts or other electrical malfunctions during operation which, through internal feedback, might damage the system transistors.

In this pulse generator the sole form of current limiting is through an increment in system frequency; therefore, at the moment of lamp ignition the capacitance of the gas discharge lamp load is high and diminishes on establishment of an arc in the lamp or lamps with a correspondingly high initial current draw. This characteristic is highly beneficial to instantaneous starting as well as protecting lamp filaments.

In order that the manner in which the foregoing and other objects are attained in accordance with the invention can be understood in detail, particularly advantageous embodiments thereof will be described with reference to the accompanying drawings, which form a part of this specification, and wherein.

DETAILED DESCRIPTION OF PRESENT INVENTION

Before considering the various circuit diagrams in detail, a brief discussion of the pulse generator system in general and its operation will be provided.

This pulse generator is comprised basically of two circuits, one being a driver circuit for the other which is a driven circuit, the two circuits being magnetically coupled by a five-winding transformer.

One end of each of the two primary windings is attached to a common junction which forms one of the power input feed terminals. The other end of each of the primary windings is connected respectively to one of the emitters of the power transistors. The third secondary winding of the transformer is common to both circuits and the 180° alternating DC pulses in the two primary windings are induced into said third secondary winding which, in turn, is connected to the system load, the remaining two windings of the transformer, the first and second secondary windings, are utilized respectively for the two feedback circuits of the generator. The first of those feedback circuits is formed, as indicated, by the base-emitter junction of the signal transistor connected to the base-emitter junction of the power transistor, a low capacitance capacitor, a limiting resistor, a slow forward recovery diode, and the first secondary transformer winding. The second feedback circuit, fully inductively driven, is formed in a similar manner to the first one with the exception that no low capacitance capacitor is incorporated and that it is connected to the second secondary winding.

Oscillations are initiated in the generator by means of an adjustable resistance which plarizes, in the forward direction, the bases of the signal transistor and the power transistor in the driver circuit to make them conduct.

Figure 1:
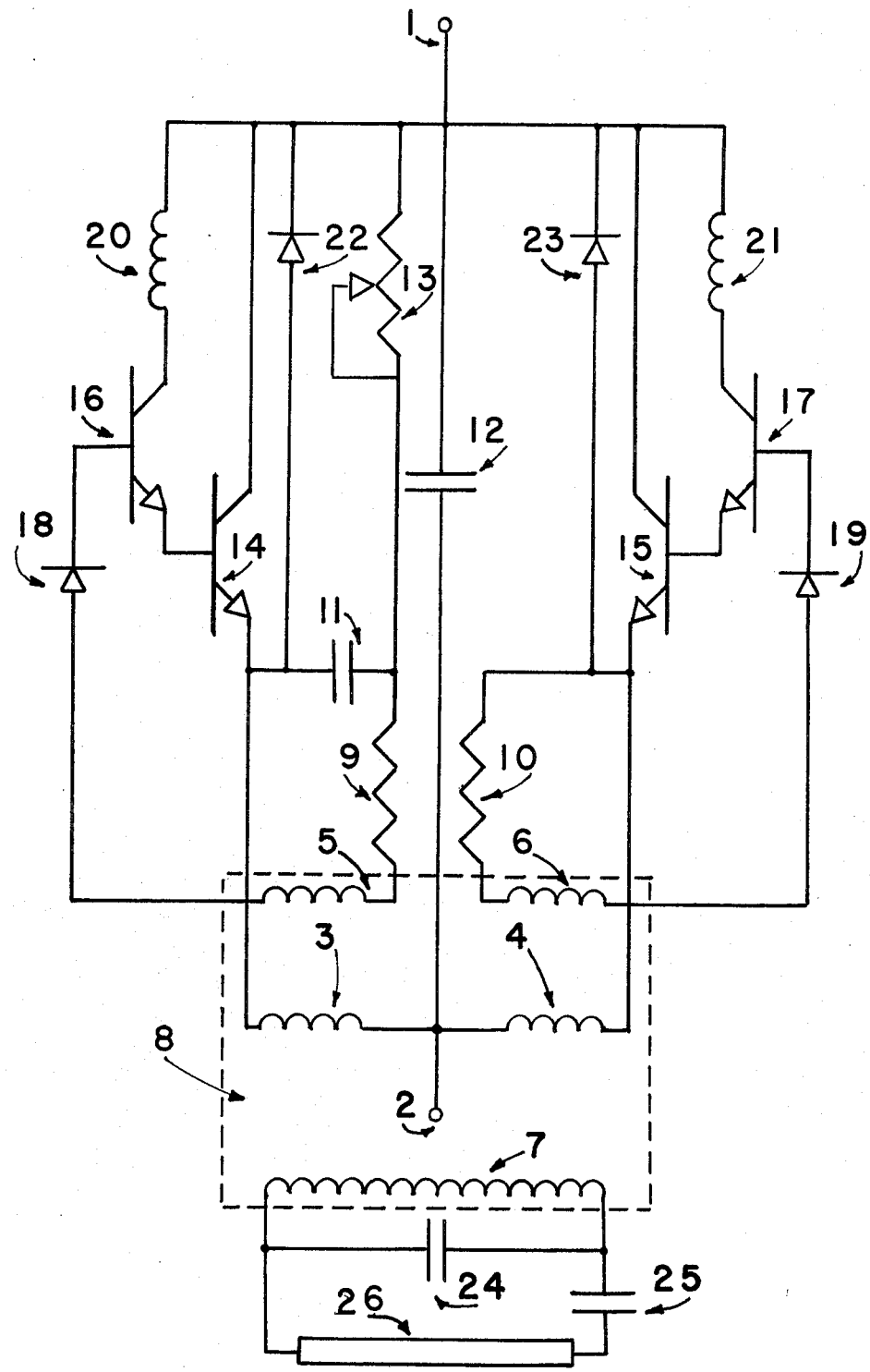
FIG. 1 is a schematic circuit diagram of the generator in accordance with the present invention.

Turning to the drawing figures, FIG. 1 shows the pulse generator with input terminals 1 and 2 that are connected to a source of unidirectional current, i.e., either direct current or rectified alternating current which is filtered through condenser 12. The polarity of the system transistors may be either NPN or PNP but all must have the same polarity. In the presently illustrated NPN embodiment, terminal 1 must be positive.

Figure 2:
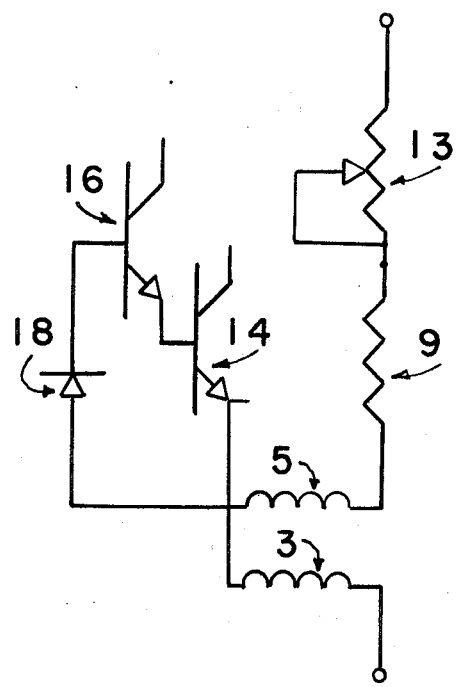
FIG. 2 is a simplified partial circuit diagram illustrating the polarization circuit for producing conductivity in the first or driver circuit.

As can be seen, and as more clearly illustrated in FIG. 2, a small continuous current will flow through adjustable resistance 13, resistance 9, winding 5 (the first secondary) of transformer 8, forward-biased diode 18, the base-emitter junction of signal transistor 16, the base-emitter junction of power transistor 14, winding 3 (the first primary) of transformer 8 and, completing the circuit, to negative terminal 2. As a consequence of a positive potential on the bases of both transistors, they become conductive and permit a progressively increasing current to flow through winding 3 of transformer 8. Circuit electrical resistance is practically nil since winding 3 of transformer 8 presents little or no opposition to direct current flow. However, due to this current flowing through winding 3, an opposing electromotive force is induced in winding 5 which removes the positive polarization from the base of signal transistor 16, in this form forcing both transistors 16 and 14 to become nonconductive.

Figure 3:
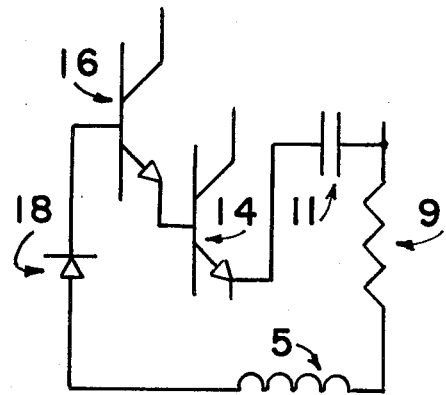
FIG. 3 is a simplified circuit diagram of the negative feedback loop of the motor or driver circuit.
Figure 4:
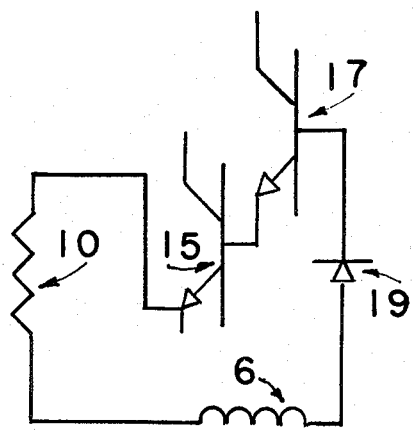
FIG. 4 is a simplified circuit diagram of the positive and negative inductive feedback loop in the driven circuit.

As a result of negative feedback, the positive current flow is therefore removed. This negative feedback circuit, i.e., those circuit elements which function to provide negative feedback, is illustrated in FIG. 3. The positive cycle is then repeated due to the action of resistor 13. Moreover, when the magnitude of the current flowing through winding 3 is decreasing, a forward electromotive force (EMF) is induced across winding 6 (the second secondary), since a 180° phase angle exists between windings 3 and 6, thus forward biasing the bases of transistors 15 and 17 and initiating conduction through those transistors. During the second half of the cycle, when the current magnitude through winding 3 is increasing, as a result of the forward current flow through resistor 13, a counter electromotive force is induced in winding 6 which drives the bases of transistors 15 and 17 to zero, thus rendering those transistors nonconductive. (The diagram in FIG. 4 depicts and clarifies the positive and negative feedback circuit of the pulse generator).

Furthermore, when the amplitude of the current pulse in winding 3 is reducing, as a result of the negative feedback in the motor circuit, in winding 4 (the second primary) of transformer 8 current amplitude is increasing. This phenomenon is repeated alternately and induces across winding 7 (the third secondary) of transformer 8 an alternating electromotive force which provides the alternating current for the load, the frequency of which is determined by the equivalent capacity of the entire system.

Figure 5:
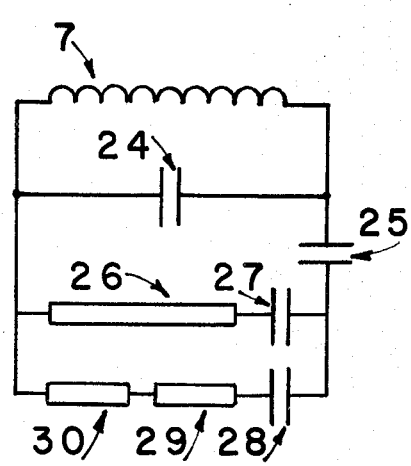
FIG. 5 is a circuit diagram of the secondary circuit of the five winding transformer with a load of various gas discharge lamps.

FIG. 5 shows one application of this generator, i.e., to ignite and power a group of gas discharge lamps 26, 29, and 30 capacitively connected by capacitors 24, 25, 27 and 28.

While certain advantageous embodiments have been chosen to illustrate the invention it will be understood by those skilled in the art that various changes and modifications can be made therein without departing from the scope of the invention as defined in the appended claims.

What is claimed is:

1. A pulse generator circuit comprising
   first and second terminals connectable to a unidirectional power source;
   a transformer having a nonsaturating core and five magnetically coupled windings on said core including first and second primary windings and first, second and third secondary windings,
   one end of each of said primary windings being connected to said first terminal,
   said first and second secondary windings having substantially the same number of turns;
   said third secondary winding being connectable to a load device;
   first feedback circuit means for providing negative feedback comprising
   a first signal transistor having its collector connected to said second terminal;
   a resistor;
   a capacitor;
   a first forward biased slow-recovery diode connected to the base of said first signal transistor and to one end of said first secondary winding; and
   a first power transistor having its base connected to the emitter of said first signal transistor, having its emitter connected through said capacitor and said first resistor to the other end of said first secondary winding, and having its collector connected to said second terminal; and
   second feedback circuit means for alternately providing positive and negative feedback comprising a second signal transistor having its collector connected to said second terminal;
a second resistor;
a second slow recovery diode connected to the base of said second signal transistor and to one end of said second secondary winding; and
a second power transistor having its base connected to the emitter of said second signal transistor, having its emitter connected through said second resistor to the opposite end of said second secondary winding, and having its collector connected to said second terminal.

2. A pulse generator according to claim 1 and further comprising first and second high inductance choke coils, one of said choke coils being connected in series with each of the collectors of said first and second signal transistors for protecting said transistors during open load circuit conditions and for suppressing transient phenomena.

3. A pulse generator according to claim 1 wherein said first and second secondary windings are arranged in 180° electrical phase relationship for providing distinct feedback to said circuits.

4. A pulse generator according to claim 1 and further including an adjustable resistor connected between the junction of said capacitor and resistor in said first feedback circuit means and said second terminal for establishing a conductivity level in said first feedback circuit means and adjusting the current magnitudes in said first and second primary windings.

5. A pulse generator according to claim 1 and further comprising a fast recovery backward biased diode connected in parallel circuit relationship with the emitter-collector junction of each of said power transistors.

6. A pulse generator accordingly to claim 1 and further comprising a filter capacitor connected between said first and second terminals.

* * * * *